United States Patent
Koch et al.

(10) Patent No.: US 9,976,017 B2
(45) Date of Patent: May 22, 2018

(54) POLYMER COMPOSITION FOR CAPS AND CLOSURES

(71) Applicant: INEOS EUROPE AG, Rolle (CH)

(72) Inventors: Benoit Koch, Hannut (BE); Christophe Moineau, Lyons (FR)

(73) Assignee: INEOS EUROPE AG, Rolle (CH)

( * ) Notice: Subject to any disclaimer, the term of this patent is extended or adjusted under 35 U.S.C. 154(b) by 0 days. days.

(21) Appl. No.: 15/109,849

(22) PCT Filed: Jan. 5, 2015

(86) PCT No.: PCT/EP2015/050056
§ 371 (c)(1),
(2) Date: Jul. 6, 2016

(87) PCT Pub. No.: WO2015/101668
PCT Pub. Date: Jul. 9, 2015

(65) Prior Publication Data
US 2016/0333172 A1 Nov. 17, 2016

(30) Foreign Application Priority Data
Jan. 6, 2014 (EP) .................................... 14150208

(51) Int. Cl.
| | |
|---|---|
| *C08L 23/06* | (2006.01) |
| *B65D 39/00* | (2006.01) |
| *B65D 41/00* | (2006.01) |
| *C08F 210/16* | (2006.01) |
| *C08F 4/659* | (2006.01) |
| *C08L 23/08* | (2006.01) |
| *C08F 10/02* | (2006.01) |
| *C08F 110/02* | (2006.01) |
| *C08F 4/6592* | (2006.01) |

(52) U.S. Cl.
CPC .............. *C08L 23/06* (2013.01); *B65D 39/00* (2013.01); *B65D 41/00* (2013.01); *C08F 4/65908* (2013.01); *C08F 10/02* (2013.01); *C08F 210/16* (2013.01); *C08L 23/0807* (2013.01); *C08L 23/0815* (2013.01); *C08F 4/6592* (2013.01); *C08F 4/65912* (2013.01); *C08F 4/65916* (2013.01); *C08F 110/02* (2013.01); *C08F 2500/01* (2013.01); *C08F 2500/03* (2013.01); *C08F 2500/07* (2013.01); *C08F 2500/09* (2013.01); *C08F 2500/12* (2013.01); *C08F 2500/13* (2013.01); *C08F 2500/19* (2013.01); *C08L 2203/02* (2013.01); *C08L 2203/10* (2013.01); *C08L 2205/02* (2013.01); *C08L 2205/025* (2013.01); *C08L 2207/062* (2013.01); *C08L 2207/07* (2013.01)

(58) Field of Classification Search
CPC .... C08F 210/16; C08F 10/02; C08F 4/65908; C08F 2500/09; C08F 4/65912; C08F 4/65916; C08F 4/6592; C08F 110/02; C08F 2500/19; C08F 2500/13; C08F 2500/12; C08F 2500/07; C08F 2500/03; C08F 2500/01; C08L 23/06; C08L 23/0807; C08L 23/0815; C08L 2205/02; C08L 2205/025; C08L 2203/10; C08L 2203/02; C08L 2207/07; C08L 2207/062; B65D 39/00; B65D 41/00
See application file for complete search history.

(56) References Cited

U.S. PATENT DOCUMENTS

| | | |
|---|---|---|
| 2005/0256271 A1 | 11/2005 | Lustiger et al. |
| 2009/0253863 A1* | 10/2009 | Nord-Varhaug et al. ........ C08L 23/04 525/52 |

FOREIGN PATENT DOCUMENTS

| | | |
|---|---|---|
| EP | 1 655 336 A1 | 5/2006 |
| EP | 1 655 338 A1 | 5/2006 |
| WO | WO 2012/010476 A1 | 1/2012 |

OTHER PUBLICATIONS

John M. Dealy and Kurt F. Wissbrun, "Melt Rheology and its Role in Plastics Processing", Van Nostrand Reinhold, pp. 365-376 and pp. 502-507, © 1990.†

* cited by examiner
† cited by third party

*Primary Examiner* — Nathan M Nutter
(74) *Attorney, Agent, or Firm* — Nixon & Vanderhye P.C.

(57) ABSTRACT

Polyethylene composition having a density of 950-960 kg/m$^3$, a SHI$_{(1,100)}$ of 4-12, a melt index MI$_2$ between 0.2 and 2 g/10 min, and a relationship between spiral flow 'SF' (measured in mm at 250° C./1000 bar/100 mm/s) and ESCR 'E' (measured in hours) of E>200−SF. The composition contains 48-62 wt % of an ethylene polymer (A) and 38-52 wt % of an ethylene copolymer (B). Copolymer (B) has a higher weight average molecular weight than polymer (A), and both of fractions (A) and (B) have a reverse comonomer distribution such that comonomer content increases with increasing molecular weight in the individual fraction.

27 Claims, 1 Drawing Sheet

POLYMER COMPOSITION FOR CAPS AND CLOSURES

This application is the U.S. national phase of International Application No. PCT/EP2015/050056 filed Jan. 5, 2015 which designated the U.S. and claims priority to European Patent Application No. 14150208.8 filed Jan. 6, 2014, the entire contents of each of which are hereby incorporated by reference.

The present invention relates to novel ethylene polymer compositions and to articles made therefrom, particularly articles made by injection moulding such as caps and closures.

BACKGROUND OF THE INVENTION

Injection moulding may be used to make a wide variety of articles including articles having relatively complex shapes and a range of sizes. A particularly important application is in the manufacture of caps and closures for food and drink applications, such as for bottles containing carbonated or non-carbonated drinks, or for non-food applications such as containers for cosmetics or pharmaceuticals.

Important properties of the polymer to be injection moulded are its rheology, stiffness, environmental stress crack resistance (ESCR) and organoleptic properties, requirements for all of which need to be satisfied at the same time. Injection moulded articles, particularly caps and closures, may be in contact with aggressive food and non-food media and/or subject to external stress, e.g. when used as a cap for a carbonated soft drink, and a high ESCR is therefore desirable. High ESCR values are generally obtained with polyethylenes of lower density and/or lower melt index. On the other hand, injection moulded articles also require a high stiffness as this allows a reduction in wall thickness while maintaining good dimensional stability. Stiffness generally increases as density increases.

It is further important in injection moulding that the polymer melt has the appropriate rheological properties, i.e. a flowability within certain limits to ensure that the final product properties are desirable. For example, the flowability of the polymer melt must be sufficiently high to enable it to flow to all areas of the mould when injected so as to form the desired article. Also, the higher the flow rate of the polymer melt, the greater the speed at which it can be injected into the mould and the shorter the processing time, which improves productivity. A measure of flowability which is particularly relevant to injection moulding is spiral flow, which measures the length around a spiral which molten polymer flows under a particular pressure, temperature and injection rate. A higher spiral flow indicates better processability.

For improving the flow properties, polyethylenes with broader molecular weight distribution or with higher melt index are typically chosen. However, polymers with higher melt index tend to yield products having poor ESCR. Also, a polymer with a broad molecular weight distribution may also lead to a larger degree of orientation of the polymer chains in the finished injection moulded article, which may contribute to the aforementioned poorer mechanical properties. Polyethylenes having a narrow molecular weight distribution and a low melt index are therefore better suited to reaching the desired environmental stress crack resistance, at the expense of good flow properties.

For improving the stiffness of the final article such as a cap, it is well known to increase the density of the polymer. However a higher density tend to result in a poorer ESCR.

Furthermore, especially with regard to the food applications of caps and closures, it is important that the composition has good taste and odour properties and low levels of extractables that can migrate into the food. A narrower molecular weight distribution is preferred as it means a smaller proportion of very low molecular weight material in the composition, resulting in fewer volatile fractions which could migrate into food.

Our own EP 1441959A exemplifies bimodal polyethylene compositions for caps and closures having densities in the range 951-953 kg/m$^3$, MI$_2$ values in the range 0.6-1.7 g/10 min, LMW:HMW component ratios of approximately 50:50. Values of ESCR-B above 1000 h are reported as measured on compression moulded specimen, but no ESCR data obtained on injected caps is reported. No SHI$_{1/100}$ or spiral flow values are disclosed.

WO 2007/130515 discloses polyethylene compositions suitable for caps and closures having a density of 950-960 kg/m$^3$ and a MI$_2$ of preferably 1-2 g/10 min and a g'>1.

EP 1655338A discloses a polyethylene composition for caps and closures which has an MI$_2$ of 0.1 to 100 g/10 min, a Charpy impact strength at 23° C. of at least 3 kJ/m$^2$ and a specific relationship between SHI$_{1/100}$ and log MI$_2$. All the inventive Examples are multimodal, with a density of at least 961 kg/m$^3$ and a SHI$_{1/100}$ between 8 and 14.

EP 1655336A also discloses a polyethylene composition for caps and closures, this one having an MI$_2$ of 0.1 to 100 g/10 min, an ESCR of at least 10 hours and a different relationship between SHI$_{1/100}$ and log MI$_2$. All the inventive Examples are multimodal, with a density between 956 kg/m$^3$ and 961 kg/m$^3$ and a SHI$_{1/100}$ of between 14 and 22.

EP2017302A discloses a hexene copolymer for caps and closures which has an MI$_2$ of 0.1 to 100 g/10 min, a tensile modulus >850 MPa, an ESCR-B of at least 300 hours and a Charpy impact strength at 23° C. of at least 15 kJ/m$^2$. All the examples have a molecular weight distribution (Mw/Mn) between 15 and 22.

WO2011004032 discloses a bimodal polyethylene composition for caps and closures made with a metallocene catalyst comprising two polyethylene fractions A and B, fraction A being substantially free of comonomer and providing an improved balance between environmental stress crack resistance, organoleptic properties, dimensional stability, tightness of fit and ease of opening. All inventive examples are characterised by a narrow molecular weight distribution (Mw/Mn<5).

WO2007018720 discloses a bimodal polyethylene composition for injection moulding comprising two polyethylene fractions A and B which is preferably made with a metallocene catalyst. The preferred melt index of the blend is at least 4 g/10 min, and the Examples combine an overall melt index of above 4 g/10 min with a HMW fraction having a melt index of at least 0.46 g/10 min, which equates to an HLMI of above 10 g/10 min. A HMW fraction having a high melt index/low molecular weight generally results in a composition having relatively poor stress crack resistance.

SUMMARY OF THE INVENTION

We have now discovered novel polyethylene compositions which have a particularly advantageous combination of good processability, high stiffness, good ESCR and low extractables.

The present invention provides a polyethylene composition having a density of 950-960 kg/m$^3$, a SHI$_{1/100}$ of 4-12, a melt index MI$_2$ between 0.2 and 2 g/10 min, and a relationship between spiral flow 'SF' (measured in mm at 250° C./1000 bar/100 mm/s) and ESCR 'E' (measured in hours) of E>200−SF.

Preferably the composition has a relationship between spiral flow 'SF' and ESCR 'E' of E>370−2SF and most preferably of E>540−3SF.

In an alternative aspect, the present invention provides a polyethylene composition having a density of 950-960 kg/m$^3$, a SHI$_{1/100}$ of 4-12, a melt index MI$_2$ between 0.2 and 2 g/10 min, and a relationship between spiral flow 'SF' (measured in mm at 250° C./1000 bar/100 mm/s), ESCR 'E' (measured in hours) and melt index 'MI$_2$' (measured in g/10 min according to ISO 1133 at 190° C. at load of 2.16 kg) of E>(9800−36SF−1000MI$_2$)/60 and preferably of E>(11000−36SF−1000MI$_2$)/60 and more preferably E>(12000−36SF−$^+$ 1000MI$_2$)/60.

All features below apply to both of the above aspects of the invention.

For the purposes of the present invention, MI$_2$ is measured according to ISO1133 at a temperature of 190° C. under a load of 2.16 kg.

The spiral flow 'SF' (measured at 250° C./1000 bar/100 mm/s) of the polyethylene composition is preferably greater than 10 mm, more preferably greater than 35 mm and most preferably greater than 60 mm. The SF is also preferably less than 190 mm, more preferably less than 180 mm and most preferably less than 175 mm.

In one embodiment of the invention, the polyethylene composition preferably has an MI$_2$ of between 1 and 2 g/10 min, more preferably between 1.2 and 1.8 g/10 min.

In an alternative embodiment of the invention, the polyethylene composition preferably has an MI$_2$ of between 0.1 and 1 g/10 min, more preferably between 0.2 and 0.8 g/10 min.

In one embodiment of the invention, the polyethylene composition preferably has a density of from 954 to 960 kg/m$^3$ and most particularly from 955 to 959 kg/m$^3$.

In another embodiment of the invention, the polyethylene composition preferably has a density of from 950 to 954 kg/m$^3$ and most particularly from 951 to 954 kg/m$^3$.

In one preferred embodiment, the polyethylene composition has a density between 954 to 960 kg/m$^3$ and an MI$_2$ of between 0.1 and 1 g/10 min, preferably a density between 955 to 959 kg/m$^3$ and a MI$_2$ of between 0.2 and 0.8 g/10 min.

In an alternative preferred embodiment, the polyethylene composition has a density between 950 to 954 kg/m$^3$ and an MI$_2$ of between 1 and 2 g/10 min, preferably a density between 951 to 954 kg/m$^3$ and an MI$_2$ of between 1.2 and 1.8 g/10 min.

Features below apply to all embodiments of both aspects of the invention.

The SHI$_{(1/100)}$ of the polyethylene composition is preferably between 4 and 10, more preferably between 4 and 8.

The molecular weight distribution (Mw/Mn) of the composition (measured by GPC analysis) is is preferably between 5 and 13, more preferably between 6 and 12, and most preferably between 7 and 11.

The g' of the polymer composition is preferably less than 1, wherein g' is determined according to the method described in WO 2007/130515.

The composition has a relationship between spiral flow 'SF' (measured in mm at 250° C./1000 bars/100 mm/s) and solubles 'S' (measured in g/kg) of S<0.1SF, preferably S<0.1SF−2.5 and most preferably S<0.1SF−5.

The polyethylene composition of the invention is preferably multimodal, in that it comprises at least two polyethylene components. Most preferably it is bimodal, which means that it contains significant amounts of only two polyethylene components. The form of the molecular weight distribution curve (i.e. the appearance of the graph of the polymer weight fraction as function of its molecular weight) of a multimodal polyethylene will show two or more maxima or at least be distinctly broadened in comparison with the curves for the individual fractions. For example, if a polymer is produced in a sequential multistage process utilising reactors coupled in series with different conditions in each reactor, each of the polymer fractions produced in the different reactors will have its own molecular weight distribution and weight average molecular weight. The molecular weight distribution curve of such a polymer comprises the sum of the individual curves of the fractions, typically yielding a curve for the multimodal polymer having a substantially single peak or two or more distinct maxima. A "substantially single peak" may not follow a Gaussian distribution, may be broader than a Gaussian distribution would indicate, or have a flatter peak than a Gaussian distribution. Some substantially singular peaks may have a tail on either side of the peak. In some embodiments it may be possible to mathematically resolve a "substantially single peak" in a molecular weight distribution curve into two or more components by various methods.

Preferably the composition of the invention comprises 48-62 wt % of an ethylene polymer (A) and 38-52 wt % of an ethylene copolymer (B), copolymer (B) having a higher weight average molecular weight than polymer (A). More preferably the composition comprises 50-60 wt % of ethylene polymer (A) and 40-50 wt % of ethylene copolymer (B), and most preferably it comprises 54-60 wt % of ethylene polymer (A) and 40-46 wt % of ethylene copolymer (B).

The polyethylene composition may optionally further comprise a small prepolymerisation fraction in an amount of 10 wt % or less based on total polyethylene. Alternatively or additionally it may further comprise a fraction of very high molecular weight polymer, having a higher molecular weight than the aforementioned high molecular weight polymer, in an amount of 10 wt % or less based on total polyethylene.

It is generally preferred that regardless of the total amount of each polymer in the composition, and the presence or otherwise of any additional polyethylene fractions, the weight ratio of polymer (A) to polymer (B) in the polyethylene composition is between 48:52 and 62:38, more preferably between 50:50 and 60:40 and most preferably between 54:46 and 60:40.

Ethylene polymer (A) can be a homopolymer or a copolymer of ethylene and C$_4$-C$_8$ alpha-olefin. Ethylene polymer (B) is a copolymer of ethylene and a C$_4$-C$_8$ alpha-olefin.

The amount of polymer (A) present in the composition is preferably between 48 wt % and 62 wt % based on total polyethylene, more preferably between 50 wt % and 60 wt % and most preferably between 54 wt % and 60 wt %. The amount of polymer (B) present in the composition is preferably between 38 wt % and 52 wt %, more preferably between 40 wt % and 50 wt % and most preferably between 40 wt % and 46 wt %. These amounts correspond to the weight ratio of (A) to (B) in the case where these are the only two polyethylene fractions present in the composition. However as previously described, other polyethylene fractions may optionally be present in the composition: when the amounts of polymer (A) and polymer (B) are 53-62 wt % and 38-47 wt % respectively, it is preferred that the maximum amount of any prepolymer as previously described is 5 wt %, and the maximum amount of any very high molecular weight fraction as previously described is 5 wt %.

For the purposes of the present invention, the term "homopolymer" is understood to denote an ethylene polymer composed essentially of monomer units derived from ethylene and substantially devoid of monomer units derived from other polymerisable olefins. It may contain trace amount of units derived from other polymerisable olefins which are present as impurities in the feed or recycle streams of the polymerisation process or which are carried over between stages in a multistage process, but it should contain at least about 99.7% by mole of ethylene repeating units, based on all the repeating units present in the "homopolymer". The term "copolymer of ethylene and a $C_4$-$C_8$ α-olefin" is understood to denote a copolymer comprising monomer units derived from ethylene and monomer units derived from a $C_4$-$C_8$ α-olefin and, optionally, from at least one other .alpha.-olefin. The $C_4$-$C_8$ α-olefin can be selected from olefinically unsaturated monomers comprising from 4 to 8 carbon atoms, such as, for example, 1-butene, 1-pentene, 1-hexene, 3-methyl-1-butene, 3- and 4-methyl-1-pentenes and 1-octene. Preferred alpha-olefins are 1-butene, 1-hexene and 1-octene and more particularly 1-hexene. The other alpha-olefin which may also be present additional to the $C_4$-$C_8$ α-olefin is preferably selected from olefinically unsaturated monomers comprising from 3 to 8 carbon atoms, such as, for example, propylene, 1-butene, 1-pentene, 3-methyl-1-butene, 3- and 4-methyl-1-pentenes, 1-hexene and 1-octene.

The content in copolymer (B) of monomer units derived from $C_4$-$C_8$ α-olefin, hereinafter called comonomer content, is generally at least 0.1 mol %, in particular at least 0.4 mol %. The comonomer content of copolymer (B) is usually at most 3 mol %, preferably at most 2 mol %. Comonomer content in the overall composition is preferably in the range 0.1-1 mol %, preferably in the range 0.1-0.8 mol % and most preferably in the range 0.2-0.5 mol %.

The composition of the invention is preferably characterised by a substantially uniform or reverse comonomer distribution in one or both of fractions (A) and (B). Reverse comonomer distribution is a specific comonomer content distribution for an individual fraction in which the lower molecular weight end of fraction (A) or (B) has the lower comonomer content and the higher molecular weight end of the fraction has the proportionally higher comonomer content: in other words, comonomer content increases with increasing molecular weight within the individual fraction. This is reverse of the traditional polymers wherein the lower the molecular weight of a copolymer fraction, the higher its comonomer content. A uniform comonomer distribution is defined as a comonomer distribution in which there is no increasing or decreasing trend across the full width of the molecular weight distribution of the polymer fraction. A uniform comonomer distribution may alternatively be defined as meaning that comonomer content of the polymer fractions across the molecular weight range of the particular fraction varies by less than 10 wt %, preferably by less than 8%, more preferably by less than 5%, and most preferably by less than 2%, by which is meant that the highest and lowest comonomer contents across the molecular weight range of the particular fraction deviate by less than 10% (and most preferably be less than 2%) from the average comonomer content of the fraction. For example, if the average comonomer content in a particular fraction is 2 wt % and the comonomer content varies by less than 0%, the highest is no more than 2.2 wt % and the lowest is more than 1.8 wt %. In one embodiment of the invention, the composition of the invention is characterised by a substantially reverse comonomer distribution in one or both of fractions (A) and (B).

The nature of the comonomer distribution can be determined by measuring comonomer content as a function of molecular weight. This can be done by coupling a Fourier transform infrared spectrometer (FTIR) to a Waters 1500 C Gel Permeation Chromatograph (GPC). The setting up, calibration and operation of this system together with the method for data treatment has been described previously (L. J. Rose et al, "Characterisation of Polyethylene Copolymers by Coupled GPC/FTIR" in "Characterisation of Copolymers", Rapra Technology, Shawbury UK, 1995, ISBN 1-85957-048-86.). Further details can be found in our own EP 898585A.

For the purposes of the present invention, the $C_4$-$C_8$ alpha-olefin content is measured by $^{13}C$ NMR according to the method described in J. C. Randall, JMS-Rev. Macromol. Chem. Phys., C29(2&3), p. 201-317 (1989), that is to say that the content of units derived from $C_4$-$C_8$ alpha-olefin is calculated from the measurements of the integrals of the lines characteristic of that particular $C_4$-$C_8$ alpha-olefin in comparison with the integral of the line characteristic of the units derived from ethylene (30 ppm). A composition composed essentially of monomer units derived from ethylene and a single $C_4$-$C_8$ alpha-olefin is particularly preferred. The preferred single $C_4$-$C_8$ α-olefin is selected from 1-butene, 1-hexene and 1-octene; 1-hexene is particularly preferred.

It is preferred that polymer (A) in the multimodal composition has an $MI_2$ of from 10 to 800 g/10 min, preferably from 200 to 700 g/10 min. A more preferred range of $MI_2$ for polymer (A) is from 200 to 500 g/10 min, and the most preferred range is from 250 to 450 g/10 min.

In one embodiment of the invention the ethylene polymer (A) has a density between 969 and 974 $kg/m^3$, preferably between 969 and 973 $kg/m^3$, most preferably between 970 and 973 $kg/m^3$. Preferably polymer (A) is a copolymer of ethylene and $C_4$-$C_8$ alpha-olefin.

In a preferred embodiment invention the ethylene polymer (A) has a density between 969 and 974 $kg/m^3$ and an $MI_2$ of from 10 to 800 g/10 min, preferably a density between 969 and 973 $kg/m^3$ and an $MI_2$ of from 200 to 500 g/10 min, and most preferably a density between 970 and 973 $kg/m^3$ and an $MI_2$ from 250 to 450 g/10 min.

In one embodiment of the invention in which the polyethylene composition has a density of from 950 to 954 $kg/m^3$ and more preferably from 951 to 954 $kg/m^3$, the density of copolymer (B) is between 919 and 936 $kg/m^3$ and most preferably between 924 and 932 $kg/m^3$. In this embodiment the HLMI of copolymer (B) is preferably from 3 to 6 g/10 min, more preferably from 4 to 5 g/10 min: alternatively, the $MI_2$ of copolymer (B) is preferably from 0.1 to 0.2 g/10 min, more preferably from 0.12 to 0.18 g/10 min. It is preferred that copolymer (B) has a density between 924 and 932 $kg/m^3$ and either an HLMI of from 4 to 5 g/10 min or an $MI_2$ of from 0.12 to 0.18 g/10 min. It is also preferred that the overall polyethylene composition has an $MI_2$ of between 1 and 2 g/10 min, more preferably between 1.2 and 1.8 g/10 min.

In an alternative embodiment of the invention in which the polyethylene composition has a density of from 954 to 960 $kg/m^3$ and more preferably from 955 to 959 $kg/m^3$, the density of copolymer (B) is between 929 and 947 $kg/m^3$, and preferably between 934 and 942 $kg/m^3$. In this embodiment the HLMI of the copolymer (B) is preferably of from 0.2 to 2 g/10 min, most preferably of from 0.5 to 1.5 g/10 min: alternatively, the $MI_2$ of the copolymer (B) is preferably of from 0.01 to 0.08 g/10 min, most preferably of from 0.02 to 0.05 g/10 min. It is preferred that copolymer (B) has a density between 934 and 942 kg/m$^3$ and an HLMI of from 0.5 to 1.5 g/10 min or an MI$_2$ of from 0.02 to 0.05 g/10 min. It is also preferred that the overall polyethylene composition has an MI$_2$ of between 0.1 and 1 g/10 min, more preferably between 0.2 and 0.8 g/10 min.

If polymers (A) and (B) are made separately and then blended, it is possible to measure directly the melt index, density and comonomer content of both polymers. However, if the multimodal polymer is made in a multistage process in which one polymer is made prior to the other and then the second polymer is made in the presence of the first polymer, then the melt index, density and comonomer content of the second polymer cannot be measured, and instead for the purposes of this invention they are defined as below. The definitions below would also apply to a third or subsequent polymer (if one is present) which is made in the presence of the first two polymers.

All melt indices such as HLMI and MI$_2$ of the second (or third or subsequent) polymer are defined as being the value directly measured for the second (or third or subsequent) polymer when made separately under the same polymerisation conditions as used to make the multimodal composition. In other words, the second (or third or subsequent) polymer is made separately using the same catalyst and under the same polymerisation conditions as those employed in the second (or third or subsequent) reactor of the multimodal polymerisation, and its melt index is then measured. As an alternative, the melt index of the second (or third or subsequent) polymer can also be calculated using a composition law, typically of the general form $$MI2(final)=[p1*MI2_A^{-K}+(1-p1)*MI2_B^{-K}]^{(-1/K)},$$

where k is determined empirically, for example by using blended compositions made in two separate reactors where the melt index can be measured directly. An example of such a law is described in "Prediction of melt flow rate (MFR) of bimodal polyethylenes based on MFR of their components", Bengt Hagström, Conference of Polymer Processing in Gothenburg, Aug. 19-21, 1997. In some cases MI$_2$ may be too low to be conveniently measured: in these cases either MI$_5$ or high load melt index (I$_{21}$) is measured, and that value converted to an equivalent MI$_2$. Such conversion between different melt index measurements is familiar to the person skilled in the art.

The density of the second (or third or subsequent) polymer is defined as being that calculated from the relationship:

$$\text{density (composition)} = \sum_{1}^{n} x_n \cdot d_n$$

where x is the weight fraction of component n, d is the density of component n, and n is the number of polymers in the composition.

The comonomer content of the second (or third or subsequent) polymer is defined as being that calculated from the relationship:

$$\text{comonomer content (composition)} = \sum_{1}^{n} x_n \cdot c_n$$

where x is the weight fraction of component n, c is the comonomer content of component n, and n is the number of polymers in the composition.

If the polymer is made with a "multiple catalyst system" such as a bimetallic catalyst, it is possible to make both polymers (A) and (B) in the same reactor. In such a case it is not possible to measure directly the properties of either polymer (A) or polymer (B). Therefore in this case the properties of both polymers (A) and (B) are defined as being those obtained when the respective polymers are prepared separately using the individual catalysts of the "multiple catalyst system", and under the same polymerisation conditions as those employed for making the multimodal polymer composition.

Whilst the compositions of the invention may consist entirely of the polyethylene described above, the invention includes within its scope compositions comprising other components in addition to the polyethylene. In particular, the composition may contain conventional additives in an amount of up to 10 wt %, preferably up to 5 wt % and more preferably up to 3 wt % based on the total weight of the composition. Such additives include stabilizers (antioxidizing agents and/or anti-UV agents), antistatic agents and processing aids, as well as pigments. The composition may also contain up to 10 wt % of another polyolefin.

The preferred multimodal polyethylene composition of the invention may be produced by any of the methods known in the art, such as mechanically blending polymers (A) and (B) and optionally other polyethylenes, in situ formation of polymers (A) and (B) in the presence of a "multiple catalyst system", and formation of polymers (A) and (B) in a multistage process. Blending may be carried out in any conventional blending apparatus.

By a "multiple catalyst system" is meant a composition, mixture or system including at least two different catalyst compounds, each having the same or a different metal group, including a "dual catalyst," e.g., a bimetallic catalyst. Use of a multiple catalyst system enables a multimodal product to be made in a single reactor. Each different catalyst compound of the multiple catalyst system may reside on a single support particle, in which case a dual (bimetallic) catalyst is considered to be a supported catalyst. However, the term bimetallic catalyst also broadly includes a system or mixture in which one of the catalysts resides on one collection of support particles, and another catalyst resides on another collection of support particles. Preferably, in that latter instance, the two supported catalysts are introduced to a single reactor, either simultaneously or sequentially, and polymerisation is conducted in the presence of the bimetallic catalyst system, i.e., the two collections of supported catalysts. Alternatively, the multiple catalyst system includes a mixture of unsupported catalysts in slurry form. One catalyst may be used to produce the HMW component, and the other may be used to produce the LMW component. The LMW catalyst is usually more responsive to chain termination reagents, such as hydrogen, than the HMW catalyst.

However the polyethylene composition of the invention is preferably obtained by a multistage ethylene polymerisation, typically using a series of reactors. A multistage process is a polymerisation process in which a polymer comprising two or more fractions is produced by producing at least two polymer fraction(s) in separate reaction stages, usually with different reaction conditions in each stage, in the presence of the reaction product of the previous stage. The polymerisation reactions used in each stage may involve conventional ethylene homopolymerisation or copolymerisation reactions, e.g. gas-phase, slurry phase, liquid phase polymerisations, using conventional reactors, e.g. loop reactors, gas phase reactors, batch reactors etc.

It is preferred that the polymer (A) is produced in the first reactor, and that polymer (B) is produced in a subsequent reactor. However this order may be reversed. If the multimodal composition includes a prepolymer, this is made in a reactor preceding the first reactor. It is preferred that all reactors are slurry reactors, in particular slurry loop reactors.

In a particularly preferred multistage polymerisation process:

in a first reactor, ethylene and optionally a $C_4$-$C_8$ α-olefin comonomer are is polymerized in slurry in a first mixture comprising a diluent, hydrogen, a catalyst based on a transition metal and a cocatalyst, so as to form from 45 to 55% by weight with respect to the total weight of the composition of an ethylene homopolymer or copolymer (A);

said first mixture is withdrawn from said reactor and is subjected to a reduction in pressure, so as to degas at least a portion of the hydrogen to form an at least partially degassed mixture, and said at least partially degassed mixture, together with ethylene and a $C_4$-$C_8$ α-olefin and, optionally, at least one other α-olefin are introduced into a subsequent reactor and the slurry polymerization is carried out therein in order to form from 45 to 55% by weight, with respect to the total weight of the composition, of a copolymer of ethylene and of $C_4$-$C_8$ α-olefin.

The invention also provides a process for obtaining a injection-moulded article, comprising the steps of polymerising ethylene and optionally comonomer, compounding the polyethylene composition, and then injection moulding the composition to form an article. The step of polymerising ethylene preferably forms a multimodal polyethylene.

The catalyst employed in the polymerisation process to produce the polyethylene compositions of the invention may be any catalyst(s) suitable for preparing such polyethylenes. If the polyethylene is multimodal, it is preferred that the same catalyst produces both the high and low molecular weight fractions. For example, the catalyst may be a Ziegler-Natta catalyst or a metallocene catalyst. Preferably the catalyst is a metallocene catalyst.

It is preferred that the compositions of the invention are made using a metallocene catalyst system, and the most preferred metallocene is that typically comprising a monocyclopentadienyl metallocene complex having a 'constrained geometry' configuration, together with a suitable activator. Examples of monocyclopentadienyl or substituted monocyclopentadienyl complexes suitable for use in the present invention are described in EP 416815, EP 418044, EP 420436 and EP 551277.

Suitable complexes may be represented by the general formula:

wherein Cp is a single cyclopentadienyl or substituted cyclopentadienyl group optionally covalently bonded to M through a substituent, M is a Group IVA metal bound in a $\eta^5$ bonding mode to the cyclopentadienyl or substituted cyclopentadienyl group, X each occurrence is hydride or a moiety selected from the group consisting of halo, alkyl, aryl, aryloxy, alkoxy, alkoxyalkyl, amidoalkyl, siloxyalkyl etc. having up to 20 non-hydrogen atoms and neutral Lewis base ligands having up to 20 non-hydrogen atoms or optionally one X together with Cp forms a metallocycle with M and n is dependent upon the valency of the metal.

Preferred monocyclopentadienyl complexes have the formula:

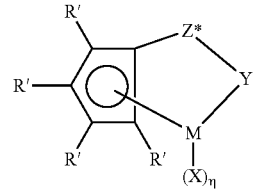

wherein:—
R' each occurrence is independently selected from hydrogen, hydrocarbyl, silyl, germyl, halo, cyano, and combinations thereof, said R' having up to 20 nonhydrogen atoms, and optionally, two R' groups (where R' is not hydrogen, halo or cyano) together form a divalent derivative thereof connected to adjacent positions of the cyclopentadienyl ring to form a fused ring structure;

X is hydride or a moiety selected from the group consisting of halo, alkyl, aryl, aryloxy, alkoxy, alkoxyalkyl, amidoalkyl, siloxyalkyl etc. having up to 20 non-hydrogen atoms and neutral Lewis base ligands having up to 20 non-hydrogen atoms, Y is —O—, —S—, —NR*—, —PR*—, M is hafnium, titanium or zirconium, Z* is $SiR^*_2$, $CR^*_2$, $SiR^*_2SiR^*_2$, $CR^*_2CR^*_2$, $CR^*$=$CR^*$, $CR^*_2SiR^*_2$, or $GeR^*_2$, wherein:

R* each occurrence is independently hydrogen, or a member selected from hydrocarbyl, silyl, halogenated alkyl, halogenated aryl, and combinations thereof, said R* having up to 10 non-hydrogen atoms, and optionally, two R* groups from Z* (when R* is not hydrogen), or an R* group from Z* and an R* group from Y form a ring system, and n is 1 or 2 depending on the valence of M.

Examples of suitable monocyclopentadienyl complexes are (tert-butylamido) dimethyl (tetramethyl-$\eta^5$-cyclopentadienyl) silanetitanium dichloride and (2-methoxyphenylamido) dimethyl (tetramethyl-$\eta^5$-cyclopentadienyl) silanetitanium dichloride.

Particularly preferred metallocene complexes for use in the preparation of the copolymers of the present invention may be represented by the general formula:

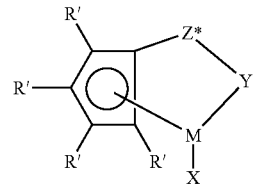

wherein:—
R' each occurrence is independently selected from hydrogen, hydrocarbyl, silyl, germyl, halo, cyano, and combinations thereof, said R' having up to 20 nonhydrogen atoms, and optionally, two R' groups (where R' is not hydrogen, halo or cyano) together form a divalent derivative thereof connected to adjacent positions of the cyclopentadienyl ring to form a fused ring structure;

X is a neutral $\eta^4$ bonded diene group having up to 30 non-hydrogen atoms, which forms a π-complex with M;

Y is —O—, —S—, —NR*—, —PR*—,

M is titanium or zirconium in the +2 formal oxidation state;

Z* is $SiR^*_2$, $CR^*_2$, $SiR^*_2SIR^*_2$, $CR^*_2CR^*_2$, $CR^*$=$CR^*$, $CR^*_2SiR^*_2$, or $GeR^*_2$, wherein:

R* each occurrence is independently hydrogen, or a member selected from hydrocarbyl, silyl, halogenated alkyl, halogenated aryl, and combinations thereof, said R* having up to 10 non-hydrogen atoms, and optionally, two R* groups from Z* (when R* is not hydrogen), or an R* group from Z* and an R* group from Y form a ring system.

Examples of suitable X groups include s-trans-$\eta^4$-1,4-diphenyl-1,3-butadiene; s-trans-$\eta^4$-3-methyl-1,3-pentadiene; s-trans-$\eta^4$-2,4-hexadiene; s-trans-$\eta^4$-1,3-pentadiene; s-trans-$\eta^4$-1,4-ditolyl-1,3-butadiene; s-trans-$\eta^4$-1,4-bis(trimethylsilyl)-1,3-butadiene; s-cis-$\eta^4$-3-methyl-1,3-pentadiene; s-cis-$\eta^4$-1,4-dibenzyl-1,3-butadiene; s-cis-$\eta^4$-1,3-pentadiene; s-cis-$\eta^4$-1,4-bis(trimethylsilyl)-1,3-butadiene, said s-cis diene group forming a π-complex as defined herein with the metal.

Most preferably R' is hydrogen, methyl, ethyl, propyl, butyl, pentyl, hexyl, benzyl, or phenyl or 2 R' groups (except hydrogen) are linked together, the entire $C_5R'_4$ group thereby being, for example, an indenyl, tetrahydroindenyl, fluorenyl, terahydrofluorenyl, or octahydrofluorenyl group.

Highly preferred Y groups are nitrogen or phosphorus containing groups containing a group corresponding to the formula —N(R″)— or —P(R″)— wherein R″ is $C_{1-10}$ hydrocarbyl.

Most preferred complexes are amidosilane—or amidoalkanediyl complexes.

Most preferred complexes are those wherein M is titanium.

Specific complexes are those disclosed in WO 95/00526 and are incorporated herein by reference.

A particularly preferred complex is (t-butylamido) (tetramethyl-$\eta^5$-cyclopentadienyl) dimethyl silanetitanium-$\eta^4$-1.3-pentadiene.

Suitable cocatalysts for use in the preparation of the novel copolymers of the present invention are those typically used with the aforementioned metallocene complexes.

These include aluminoxanes such as methyl aluminoxane (MAO), boranes such as tris(pentafluorophenyl) borane and borates.

Aluminoxanes are well known in the art and preferably comprise oligomeric linear and/or cyclic alkyl aluminoxanes. Aluminoxanes may be prepared in a number of ways and preferably are prepare by contacting water and a tri-alkylaluminium compound, for example trimethylaluminium, in a suitable organic medium such as benzene or an aliphatic hydrocarbon.

A preferred aluminoxane is methyl aluminoxane (MAO).

Other suitable cocatalysts are organoboron compounds in particular triarylboron compounds. A particularly preferred triarylboron compound is tris(pentafluorophenyl) borane.

Other compounds suitable as cocatalysts are compounds which comprise a cation and an anion. The cation is typically a Bronsted acid capable of donating a proton and the anion is typically a compatible non-coordinating bulky species capable of stabilizing the cation.

Such cocatalysts may be represented by the formula:

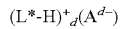

$(L^*\text{-}H)^+_d (A^{d-})$ wherein:—
L* is a neutral Lewis base
$(L^*\text{-}H)^+_d$ is a Bronsted acid
$A^{d-}$ is a non-coordinating compatible anion having a charge of d−, and
d is an integer from 1 to 3.

The cation of the ionic compound may be selected from the group consisting of acidic cations, carbonium cations, silylium cations, oxonium cations, organometallic cations and cationic oxidizing agents.

Suitably preferred cations include trihydrocarbyl substituted ammonium cations eg. triethylammonium, tripropylammonium, tri(n-butyl)ammonium and similar. Also suitable are N.N-dialkylanilinium cations such as N,N-dimethylanilinium cations.

The preferred ionic compounds used as cocatalysts are those wherein the cation of the ionic compound comprises a hydrocarbyl substituted ammonium salt and the anion comprises an aryl substituted borate.

Typical borates suitable as ionic compounds include:
triethylammonium tetraphenylborate
triethylammonium tetraphenylborate,
tripropylammonium tetraphenylborate,
tri(n-butyl)ammonium tetraphenylborate,
tri(t-butyl)ammonium tetraphenylborate,
N,N-dimethylanilinium tetraphenylborate,
N,N-diethylanilinium tetraphenylborate,
trimethylammonium tetrakis(pentafluorophenyl) borate,
triethylammonium tetrakis(pentafluorophenyl) borate,
tripropylammonium tetrakis(pentafluorophenyl) borate,
tri(n-butyl)ammonium tetrakis(pentafluorophenyl) borate,
N,N-dimethylanilinium tetrakis(pentafluorophenyl) borate,
N,N-diethylanilinium tetrakis(pentafluorophenyl) borate.

A preferred type of cocatalyst suitable for use with the metallocene complexes comprise ionic compounds comprising a cation and an anion wherein the anion has at least one substituent comprising a moiety having an active hydrogen.

Suitable cocatalysts of this type are described in WO 98/27119 the relevant portions of which are incorporated herein by reference.

Examples of this type of anion include:
triphenyl(hydroxyphenyl) borate
tri (p-tolyl)(hydroxyphenyl) borate
tris (pentafluorophenyl)(hydroxyphenyl) borate
tris (pentafluorophenyl)(4-hydroxyphenyl) borate Examples of suitable cations for this type of cocatalyst include triethylammonium, triisopropylammonium, diethylmethylammonium, dibutylethylammonium and similar.

Particularly suitable are those cations having longer alkyl chains such as dihexyldecylmethylammonium, dioctadecylmethylammonium, ditetradecylmethylammonium, bis(hydrogenated tallow alkyl) methylammonium and similar.

Particular preferred cocatalysts of this type are alkylammonium tris(pentafluorophenyl) 4-(hydroxyphenyl) borates. A particularly preferred cocatalyst is bis(hydrogenated tallow alkyl) methyl ammonium tris (pentafluorophenyl) (4-hydroxyphenyl) borate.

With respect to this type of cocatalyst, a preferred compound is the reaction product of an alkylammonium tris (pentafluorophenyl)-4-(hydroxyphenyl) borate and an organometallic compound, for example a trialkylaluminium or an aluminoxane such as tetraisobutylaluminoxane. Suitable cocatalysts of this type are disclosed in WO 98/27119 and WO 99/28353. Preferred trialkylaluminium compounds are triethylaluminium or trimethylaluminium, the latter being particular preferred. The contact between the borate and the trialkylaluminium compound is typically performed in a suitable solvent at room temperature, and more preferably at a temperature in the range −25° C. to 10° C. Preferred solvents for the contact are aromatic solvents in particular toluene.

The catalysts used to prepare the novel copolymers of the present invention may suitably be supported.

Suitable support materials include inorganic metal oxides or alternatively polymeric supports may be used for example polyethylene, polypropylene, clays, zeolites, etc.

The most preferred support material for use with the supported catalysts according to the method of the present invention is silica having a median diameter (d50) from 20 to 70 μm, preferably from 30 to 60 μm. Particularly suitable supports of this type are Grace Davison D948 or Sylopol 2408 silicas as well as PQ Corporation ES70 or ES757 silicas.

The support material may be subjected to a heat treatment and/or chemical treatment to reduce the water content or the hydroxyl content of the support material. Typically chemical dehydration agents are reactive metal hydrides, aluminium alkyls and halides. Prior to its use the support material may be subjected to treatment at 100° C. to 1000° C. and preferably at 200 to 850° C. in an inert atmosphere.

The porous supports are preferably pretreated with an organometallic compound preferably an organoaluminium compound and most preferably a trialkylaluminium compound in a dilute solvent.

The support material is pretreated with the organometallic compound at a temperature of −20° C. to 150° C. and preferably at 20° C. to 100° C.

A further possible catalyst comprises a metallocene complex which has been treated with polymerisable monomers. Our earlier applications WO 04/020487 and WO 05/019275 describe supported catalyst compositions wherein a polymerisable monomer is used in the catalyst preparation.

Polymerisable monomers suitable for use in this aspect of the present invention include ethylene, propylene, 1-butene, 1-hexene, 1-octene, 1-decene, styrene, butadiene, and polar monomers for example vinyl acetate, methyl methacrylate, etc. Preferred monomers are those having 2 to 10 carbon atoms in particular ethylene, propylene, 1-butene or 1-hexene. The most preferred comonomer is 1-hexene.

In the preferred process utilised to make the composition of the present invention, a slurry comprising the composition of the invention is collected at the outlet of the further polymerisation reactor. The composition may be separated from the suspension by any known means. Usually, the suspension is subjected to a pressure expansion (final expansion) so as to eliminate the diluent, the ethylene, the α-olefin and any hydrogen from the composition.

Typically the compositions of the invention are compounded into pellets, which may optionally then be used in the manufacture of articles. Compounding equipment and conditions are well known to those skilled in the art.

The compositions made according to the invention can be mixed with the usual processing additives for polyolefins, such as stabilizers (antioxidizing agents and/or anti-UV agents), antistatic agents and processing aids, as well as pigments. Examples include calcium stearate or zinc stearate as an acid neutraliser, Irgafos 168 as a process antioxidant, and Irganox 1010 or 1076 as a thermal antioxidant, and hydrated metal salts such as magnesium chloride to reduce the yellow index of the polymer.

BRIEF DESCRIPTION OF THE DRAWINGS

The invention is further described with reference to the accompanying drawings, in which.

EXAMPLES

Figure 1:
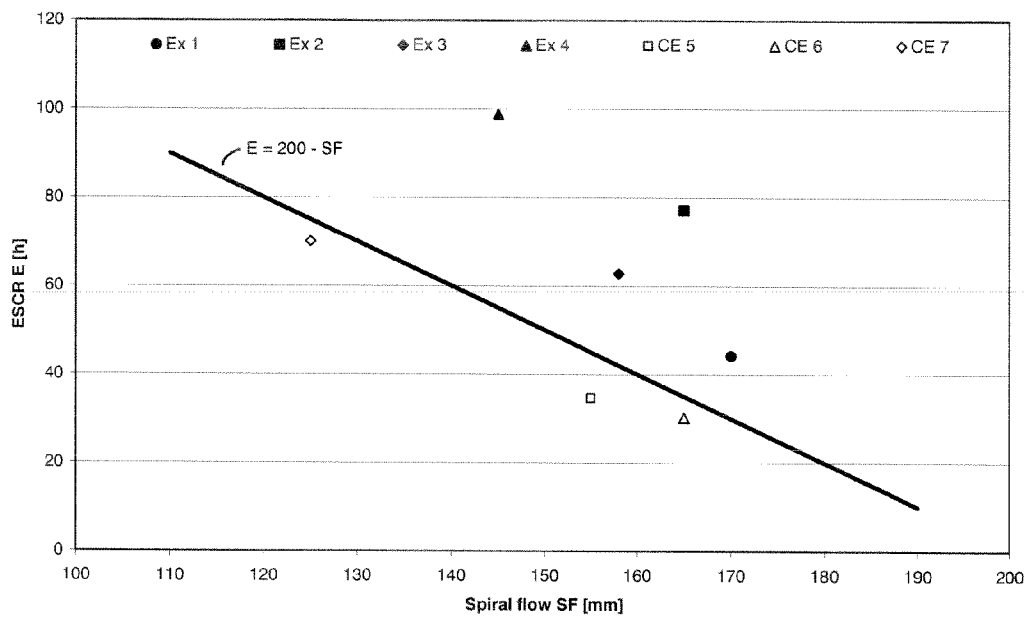
FIGS. 1 and 2 show the improved balance of properties for the examples of the invention such as high ESCR, low levels of solubles and high values for spiral flow indicative of good processability in the injection molding process.

The meanings of the symbols used in these examples and the units expressing the properties mentioned and the methods for measuring these properties are explained below.

Melt Index

Melt indices $MI_2$ and HLMI are determined according to ISO1133 at a temperature of 190° C. under a load of 2.16 kg and 21.6 kg, respectively, are indicated in g/10 min.

Density

Density of the polyethylene was measured according to ISO 1183-1 (Method A) and the sample plaque was prepared according to ASTM D4703 (Condition C) where it was cooled under pressure at a cooling rate of 15° C./min from 190° C. to 40° C.

Solubles

Solubles were measured on a sample of 1.5 g by extraction with a Kumagawa extractor using n-hexane under reflux at 68° C. for 2 hours. The weight of $C_6$-solubles is determined by the difference of weight before and after extraction, the sample being dried in an oven to eliminate any trace of n-hexane.

Spiral Flow

Spiral Test is carried out using a FANUC S2000i 150A injection moulding apparatus with a spiral mould. The spiral mould is a conventional mould with a spiral cavity of circular form, a thickness of 1 mm and breadth of 10 mm. The flow length is measured with a long spiral flow channel emanating from the center; notches are typically etched along the flow path to help identify the length the polymer has flowed within the mould. The mould is filled using a rotating screw in the barrel operating at a constant speed (injection speed). During the filling phase of the mould, the specific injection pressure on the screw increases progressively until it reaches 1000 bar, which is set in the injection moulding apparatus as the commutation pressure. At this pressure the screw is stopped and the screw speed falls to zero, ending the filling phase. There is no holding phase following the filling phase (no holding pressure or holding time), and the polymer spiral starts to cool immediately until the mould can be opened to eject the solid spiral of polymer. The behaviour of the polymer is evaluated based on flow length. Flow length data are presented in millimeters. The injection conditions are shown below:

Specific injection pressure of commutation: 1000 bar
No holding pressure
Screw diameter: 32 mm
Screw rotation speed: 80 rpm
Screw injection speed: 100 mm/s
Temperature in pre-chamber and die: 250° C.
Temperature of all zones: 250° C.
Mould temperature: 40° C.
Cooling time: 20 s
Cycle time: 30 s Dynamic Rheological Analysis Dynamic rheological measurements are carried out, according to ASTM D 4440, on a dynamic rheometer (e.g., ARES) with 25 mm diameter parallel plates in a dynamic mode under an inert atmosphere. For all experiments, the rheometer has been thermally stable at 190° C. for at least 30 minutes before inserting the appropriately stabilised (with antioxidant additives), compression-moulded sample onto the parallel plates. The plates are then closed with a positive normal force registered on the meter to ensure good contact. After about 5 minutes at 190° C., the plates are lightly compressed and the surplus polymer at the circumference of the plates is trimmed. A further 10 minutes is allowed for thermal stability and for the normal force to decrease back to zero. That is, all measurements are carried out after the samples have been equilibrated at 190° C. for about 15 minutes and are run under full nitrogen blanketing.

Two strain sweep (SS) experiments are initially carried out at 190° C. to determine the linear viscoelastic strain that would generate a torque signal which is greater than 10% of the lower scale of the transducer, over the full frequency (e.g. 0.01 to 100 rad/s) range. The first SS experiment is carried out with a low applied frequency of 0.1 rad/s. This test is used to determine the sensitivity of the torque at low frequency. The second SS experiment is carried out with a high applied frequency of 100 rad/s. This is to ensure that the selected applied strain is well within the linear viscoelastic region of the polymer so that the oscillatory rheological measurements do not induce structural changes to the polymer during testing. In addition, a time sweep (TS) experiment is carried out with a low applied frequency of 0.1 rad/s at the selected strain (as determined by the SS experiments) to check the stability of the sample during testing.

Shear Thinning Index SHI

Shear thinning index (SHI) is calculated according to Heino ("Rheological characterization of polyethylene fractions" Heino, E. L., Lehtinen, A., Tanner J., Seppäli, J., Neste Oy, Porvoo, Finland, Theor. Appl. Rheol., Proc. Int. Congr. Rheol., 11th (1992), 1, 360-362, and "The influence of molecular structure on some rheological properties of polyethylene", Heino, E. L., Borealis Polymers Oy, Porvoo, Finland, Annual Transactions of the Nordic Rheology Society, 1995.)

The SHI value is obtained by calculating the complex viscosities $\eta_1$ and $\eta_{100}$ at a constant shear stress of 1 and 100 kPa respectively. The shear thinning index $SHI_{(1/100)}$ is defined as the ratio of the two viscosities $\eta_1$ and $\eta_{100}$.

ESCR (on PCO1810 Cap Design)

Environmental stress crack resistance (ESCR) is determined on a cap made according to cap design PCO1810 having a weight of 2.9 g. The cap is screwed onto a PET-preform pre-filled with water with a torque of 25 cm·kg. The hydrostatic pressure in the PET-preform is maintained using a flexible pipe connected to its end. The cap part is entirely submerged in a 10 wt % solution of Igepal CO360. The test is done at 6 bar and 40° C.: the time taken for a pressure drop due to leakage to occur (caused by cracking of the cap) is measured. The test is done on 10 caps, and the ESCR results is calculated using the arithmetic average of the 10 test results.

All PCO1810 Caps design caps were produced by injection moulding on a Nestal Synergy machine 1000-460 with an Antonin mould having 12 cap cavities. The injection conditions are displayed below:

Screw diameter: 40 mm
Injection speed values: 8 mm/s for 1.48 s, then 23 mm/s for 0.37 s, then 36 mm/s for 0.1 is, then 48 mm/s for 0.25 s, then 66 mm/s for 0.15 s, then 49 mm/s for 0.09 s, then 16 mm/s for 0.17 s, then 8 mm/s for 0.23 s.
Injection pressure: 1400 bar
Temperature of all zones: 220° C.
Mould temperature: 10° C.
Cooling time at 10° C.: 1.75 s
Holding pressure: 1290 bar
Holding pressure time: 0.25 s Gel Permeation Chromatography Analysis for Molecular Weight Distribution Determination Apparent molecular weight distribution and associated averages, uncorrected for long chain branching, were determined by Gel Permeation (or Size Exclusion) Chromatography according to ISO16014-1, ISO 16014-2 and 16014-4, using a PL 220 of Polymer Laboratories with 4 columns WATERS STYRAGEL HMW 6E of 30 cm length and 1 guard column Waters Styragel 4.6×30 mm and a differential refractometer detector.

The solvent used was 1,2,4 trichlorobenzene at 150° C., stabilised with BHT, of 0.2 g/liter concentration. Polymer solutions of 0.8 g/liter concentration were prepared at 160° C. for one hour with stirring only in the last 30 minutes. The nominal injection volume was set at 400 μl and the nominal flow rate was 1 ml/min.

A relative calibration was constructed using 13 narrow molecular weight linear polystyrene standards:

| PS Standard | Molecular Weight |
|---|---|
| 1 | 7 520 000 |
| 2 | 4 290 000 |
| 3 | 2 630 000 |
| 4 | 1 270 000 |
| 5 | 706 000 |
| 6 | 355 000 |
| 7 | 190 000 |
| 8 | 114 000 |
| 9 | 43 700 |
| 10 | 18 600 |
| 11 | 10 900 |
| 12 | 6 520 |
| 13 | 2 950 |

The elution volume, V, was recorded for each PS standards. The PS molecular weight was then converted to PE equivalent using the following Mark Houwink parameters:
kPS=1.21 10-4 dl g-1 αPS=0.707, kPE=3.92.10-4 dl g-1, αPE=0.725.

The calibration curve Mw Pp=f(V) was then fitted with a first order linear equation. All the calculations are done with Empower 2 software from Waters.

A) Catalyst
Reagents Used
TEA Triethylaluminium
TMA Trimethylaluminium
TiBAl Triisobutylaluminium
Ionic Compound A [N(H)Me($C_{18-22}H_{37-45}$)$_2$][B($C_6F_5$)$_3$(p-OH$C_6H_4$)]
Complex A ($C_5Me_4SiMe_2N^tBu$)Ti($\eta^4$-1,3-pentadiene)

To 10.0 kg of silica ES757 (available from PQ Corporation), previously calcined at 400° C. for 5 hours, in 90 liters of hexane was added 19.28 of 0.5 mol Al/liter of TEA in hexane. After 1 hour stirring at 30° C. the silica was allowed to settle and the supernatant liquid was removed by decantation. The residue was then washed five times with 130 liters hexane and reslurried in 130 liters hexane. Then 1 liter of a solution of Statsafe 2500 (available from Innospec) in pentane (2 g/l) was added and the slurry was stirred for 15 mins.

8.19 kg of a toluene solution of Ionic Compound A (10.94% wt) were cooled to 5° C. and 342 g of a hexane solution of TMA (1 mol/L) were added over 10 mins. After stirring for a further 20 mins at 5° C., the solution was transferred to the slurry containing the TEA-treated silica from the previous step over a period of 80 mins. The resulting mixture was well agitated for 3 hours at 20° C. Then 2.19 kg of a heptane solution of Complex A (9.51% wt) were added over a period of 30 minutes and the mixture was well agitated for another 3 hours at 20° C. Then the slurry was allowed to settle and the supernatant was removed by decantation. The residue was then washed three times with 150 liters hexane and dried in vacuum at 45° C. until a free flowing green powder was obtained.

[Al]=1.11 mmol/g
[Ti]=38 μmol/g
[B]=48 μmol/g

B) Composition

The manufacture of a composition according to the invention was carried out in suspension in a multistage reaction in two loop reactors of volume 200 L and 300 L respectively, preceded a prepolymerisation in a 40 L loop reactor. The reactors were connected in series, the slurry from the prepolymerisation reactor was transferred directly to the first loop reactor. The second loop reactor was separated from the first loop reactor by a device making it possible to continuously carry out a reduction in pressure. Examples 1 and CE5 employ hexane as diluents and 1-butene as comonomer, examples 2-4 employ isobutene as diluent and 1-hexene as comonomer.

Diluent, ethylene, hydrogen, TiBAl (10 ppm) and the catalyst prepared in as described above were continuously introduced into the prepolymerisation reactor and the polymerisation of ethylene was carried out in this mixture in order to form the prepolymer (P). The mixture, additionally comprising the prepolymer (P), was continuously withdrawn from the said prepolymerisation reactor and introduced into the first reactor. Additional diluent, ethylene, hydrogen TiBAl (10 ppm) and optionally α-olefin comonomer were continuously introduced into the first loop reactor and the polymerisation reaction was carried out in this mixture in order to obtain a first ethylene polymer fraction (A). The mixture, additionally comprising the first polymer (A) was continuously withdrawn from said first reactor and subjected to a reduction in pressure (~45° C., 6.0 bar), so as to remove at least a portion of the hydrogen. The resulting mixture, at least partially degassed of hydrogen, was then continuously introduced into a second polymerisation reactor, at the same time as ethylene, comonomer, diluent and hydrogen, and the copolymerisation of ethylene and α-olefin was carried out therein in order to form the ethylene/α-olefin copolymer fraction (B). The suspension containing the polymer composition was continuously withdrawn from the second reactor and this suspension was subjected to a final reduction in pressure, so as to flash off the diluent and the reactants present (ethylene, comonomer and hydrogen). In the case where hexane was used as diluent, steam was additionally added after the final reduction in pressure to facilitate the evaporation of the diluent. The composition was then dried and degassed to remove residual hydrocarbons and recovered as a dry powder. The other polymerisation conditions and copolymer properties are specified in Table 1 and 2.

The polymer powder was then transferred to a Werner and Pfleiderer ZSK40 twin-screw extruder and compounded with the following additive package:

Tinuvin 622: 0.6 g/kg

Calcium Stearate: 2 g/kg

Irgafos 168: 1.5 g/kg

Comparative examples C6 and C7 are bimodal copolymer compositions comprising a homopolymer fraction (A) and an ethylene/l-butene copolymer fraction (B), and are prepared according to the teachings in EP 1441959A.

TABLE 1 polymerisation conditions

| EXAMPLE | 1 | 2 | 3 | 4 | CE5 |
|---|---|---|---|---|---|
| Diluent | Hx | i-$C_4$ | i-$C_4$ | i-$C_4$ | Hx |
| Comonomer | 1-$C_4$ | 1-$C_6$ | 1-$C_6$ | 1-$C_6$ | 1-$C_4$ |
| Prepolymerisation reactor | | | | | |
| Pressure (bars) | 29.4 | 37.7 | 36.8 | 36.9 | 28.5 |
| Diluent (l/h) | 108 | 108 | 108 | 108 | 108 |
| $C_2$ (kg/h) | 0.4 | 0.6 | 0.5 | 0.8 | 0.7 |
| $H_2$ (g/h) | 1.0 | 0.7 | 0.7 | 0.6 | 0.6 |
| T (° C.) | 29 | 35 | 28 | 29 | 28 |
| Residence time (h) | 0.37 | 0.45 | 0.49 | 0.48 | 0.37 |
| wt % prepolymer (P) | 2 | 2 | 2 | 2 | 2 |
| Reactor 1 | | | | | |
| Pressure (bars) | 29.4 | 38.1 | 37.0 | 37.3 | 28.7 |
| Diluent (l/h) | 158 | 158 | 158 | 158 | 158 |
| $C_2$ (kg/h) | 21.0 | 21.5 | 21.0 | 21.0 | 20.5 |
| Comonomer | 1-$C_4$ | 1-$C_6$ | 1-$C_6$ | 1-$C_6$ | — |
| Comonomer (g/h) | 41.5 | 53.9 | 56.8 | 33.2 | 0 |
| $H_2$ (g/h) | 11.7 | 13.0 | 13.4 | 14.0 | 12.0 |
| T (° C.) | 70 | 70 | 70 | 70 | 70 |
| Residence time (h) | 1.12 | 1.14 | 1.19 | 1.17 | 1.12 |
| wt % polymer (A) | 54 | 54 | 59 | 54 | 49 |
| Reactor 2 | | | | | |
| Pressure (bars) | 29.5 | 37.8 | 34.3 | 34.5 | 29.1 |
| Diluent (l/h) | 220 | 220 | 220 | 220 | 220 |
| $C_2$ (kg/h) | 19.5 | 22.5 | 17.1 | 21.1 | 23.3 |
| Comonomer | 1-$C_4$ | 1-$C_6$ | 1-$C_6$ | 1-$C_6$ | 1-$C_4$ |
| Comonomer (kg/h) | 0.36 | 1.21 | 0.38 | 0.35 | 0.52 |
| $H_2$ (g/h) | 2.00 | 1.20 | 0.64 | 0.80 | 3.5 |
| T (° C.) | 80 | 80 | 85 | 85 | 80 |
| Residence time (h) | 1.17 | 1.07 | 1.09 | 1.07 | 1.14 |
| wt % polymer (B) | 44 | 44 | 39 | 44 | 49 | i-$C_4$ = isobutane,
Hx = hexane,
1-$C_4$ = 1-butene,
1-$C_6$ = 1-hexene

TABLE 2 polymer properties

| | EXAMPLE solubles | | | | | | |
|---|---|---|---|---|---|---|---|
| | 1 | 2 | 3 | 4 | CE5 | CE6 | CE7 |
| Properties polymer fraction A | | | | | | | |
| $MI_2$ (A) (g/10 min) | 391 | 433 | 403 | 399 | 277 | 239 | 147 |
| Density (A) (kg/m$^3$) | 970.5 | 970.5 | 970.3 | 972.1 | 975.1 | 972.0 | 972.0 |
| wt % polymer (A) | 54 | 54 | 59 | 54 | 49 | 50 | 45 |
| Properties polymer fraction B* | | | | | | | |
| $MI_2$ (B) (g/10 min) | 0.16 | 0.15 | 0.02 | 0.03 | 0.32 | 0.28 | 0.17 |
| HLMI (B) (g/10 min) | 4.9 | 4.5 | 0.7 | 0.9 | 9.7 | 8.5 | 5.2 |
| Density (B) (kg/m$^3$) | 932 | 928 | 933 | 936 | 931 | 934 | 937 |

TABLE 2-continued polymer properties

| | EXAMPLE solubles | | | | | | |
|---|---|---|---|---|---|---|---|
| | 1 | 2 | 3 | 4 | CE5 | CE6 | CE7 |
| Properties polymer composition (measured after pelletisation) | | | | | | | |
| MI$_2$ (g/10 min) | 1.8 | 1.7 | 0.5 | 0.4 | 2.2 | 1.8 | 0.8 |
| Density (kg/m$^3$) | 953.6 | 952.0 | 956.0 | 956.4 | 953.5 | 953.0 | 952.5 |
| Spiral flow (mm) | 170 | 165 | 158 | 145 | 155 | 165 | 125 |
| ESCR (h) | 44.2 | 77.2 | 62.7 | 98.9 | 34.7 | 30.2 | 70.0 |
| C$_6$ Solubles (g/kg) | 11.7 | 5.6 | 10.7 | 10.8 | 9.0 | 18.2 | 13.5 |
| SHI$_{1/100}$ | 6.4 | 5.5 | 7.7 | 6.2 | 4.9 | 6.9 | 6.1 |
| Comonomer content (mol %) | 0.4 | 0.4 | 0.2 | 0.2 | n.d. | 0.5 | 0.4 |
| Mn (kDa) | 12.2 | 12.4 | n.d. | 13.3 | n.d. | n.d. | n.d. |
| Mw (kDa) | 113 | 109 | n.d. | 157 | n.d. | n.d. | n.d. |
| Mz (kDa) | 403 | 357 | n.d. | 532 | n.d. | n.d. | n.d. |
| Mw/Mn | 9.3 | 8.8 | n.d. | 11.8 | n.d. | n.d. | n.d. |

*calculated,
n.d. = not determined

Figure 2:
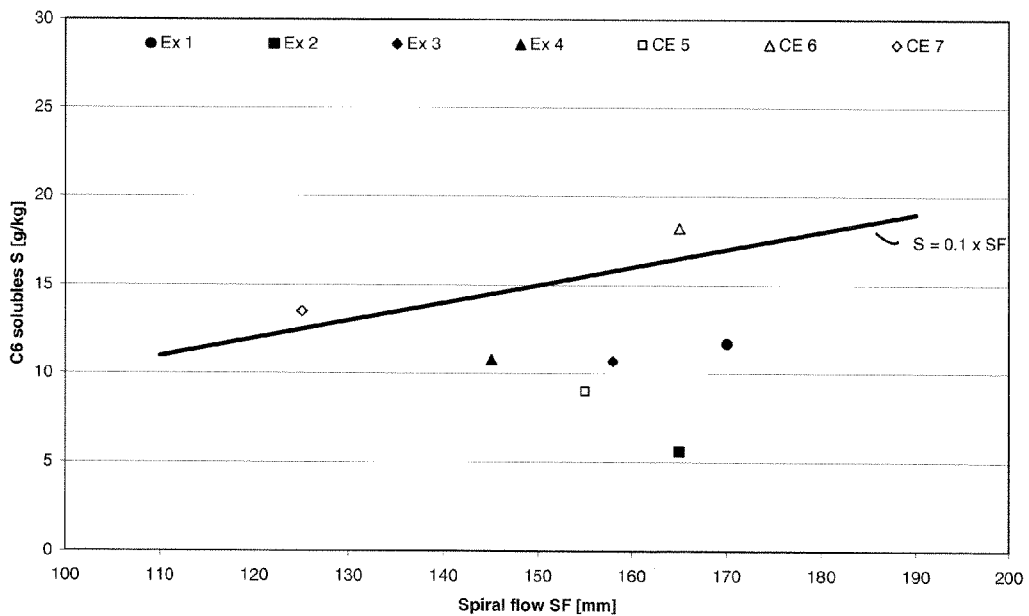

FIGS. 1 and 2 show the improved balance of properties for the examples of the invention such as high ESCR, low levels of solubles and high values for spiral flow indicative of good processability in the injection moulding process.

The invention claimed is:

1. Polyethylene composition having a density of 950-960 kg/m$^3$, a SHI$_{(1,100)}$ of 4-12, a melt index MI$_2$ between 0.2 and 2 g/10 min, and a relationship between spiral flow 'SF' (measured in mm at 250° C./1000 bar/100 mm/s) and ESCR 'E' (measured in hours) of E>200−SF, wherein the composition comprises 48-62 wt % of an ethylene polymer (A) and 38-52 wt % of an ethylene copolymer (B), copolymer (B) having a higher weight average molecular weight than copolymer (A), and both of fractions (A) and (B) have a reverse comonomer distribution such that comonomer content increases with increasing molecular weight in the individual fraction.

2. Composition according to claim 1, wherein the relationship between spiral flow 'SF' (measured in mm at 250° C./1000 bar/100 mm/s) and ESCR 'E' (measured in hours) is E>370−2SF.

3. Polyethylene composition having a density of 950-960 kg/m$^3$, of SHI$_{(1,100)}$ of 4-12, a melt index MI2 between 0.2 and 2 g/10 min, and a relationship between spiral flow 'SF' (measured in mm at 250° C./1000 bar/100 mm/s), ESCR 'E' (measured in hours) and melt index 'MI2' (measured in g/10 min according to ISO 1133 at 190° C. at load of 2.16 kg) of E>(9800−36SF−1000MI2)/60.

4. Composition according to claim 3, wherein the relationship between spiral flow 'SF', ESCR 'E' and melt index 'MI2' is E>(11000−36SF−1000MI2)/60.

5. Composition according to claim 1, which has a SHI$_{(1,100)}$ between 4 and 10.

6. Composition according to claim 1, which has a molecular weight distribution (Mw/Mn) (measured by GPC analysis) between 5 and 13.

7. Composition according to claim 1, which has a relationship between spiral flow 'SF' (measured in mm at 250° C./1000 bars/100 mm/s) and solubles 'S' (measured in g/kg) of S<0.1SF.

8. Composition according to claim 1, which comprises 50-60 wt % of ethylene polymer (A) and 40-50 wt % of ethylene copolymer (B).

9. Composition according to claim 1, wherein ethylene polymer (A) is a copolymer, and has a density between 969 and 974 kg/m3 and a MI2 of from 10 to 800 g/10 min.

10. Composition according to claim 1, which has a density between 950 to 954 kg/m3 and an MI2 of between 1 and 2 g/10 min.

11. Composition according to claim 1, which has a density between 954 to 960 kg/m3 and an MI2 of between 0.1 and 1 g/10 min.

12. Composition according to claim 1, which has a density between 950 to 954 kg/m3 and an MI2 of between 1 and 2 g/10 min, wherein the density of copolymer (B) is between 919 and 936 kg/m3 and the HLMI of copolymer (B) is from 3 to 6 g/10 min.

13. Composition according to claim 1, which has a density between 954 to 960 kg/m3 and an MI2 of between 0.1 and 1 g/10 min, wherein the density of copolymer (B) is between 929 and 947 kg/m3 the HLMI of the copolymer (B) is from 0.2 to 2 g/10 min.

14. Composition according to claim 3, which has a SHI$_{(1,100)}$ between 4 and 10.

15. Composition according to claim 3, which has a molecular weight distribution (Mw/Mn) (measured by GPC analysis) between 5 and 13.

16. Composition according to claim 3, which has a relationship between spiral flow 'SF' (measured in mm at 250° C./1000 bars/100 mm/s) and solubles 'S' (measured in g/kg) of S<0.1SF.

17. Composition according to claim 3, which comprises 48-62 wt % of an ethylene polymer (A) and 38-52 wt % of an ethylene copolymer (B), copolymer (B) having a higher weight average molecular weight Mw than polymer (A).

18. Composition according to claim 3, wherein ethylene polymer (A) is a copolymer, and has a density between 969 and 974 kg/m3 and a MI2 of from 10 to 800 g/10 min.

19. Composition according to claim 3, which has a density between 950 to 954 kg/m3 and an MI2 of between 1 and 2 g/10 min.

20. Composition according to claim 3, which has a density between 954 to 960 kg/m3 and an MI2 of between 0.1 and 1 g/10 min.

21. Composition according to claim 3, which has a density between 950 to 954 kg/m3 and an MI2 of between 1 and 2 g/10 min, wherein the density of copolymer (B) is between 919 and 936 kg/m3 and the HLMI of copolymer (B) is from 3 to 6 g/10 min.

22. Composition according to claim 3, which has a density between 954 to 960 kg/m3 and an MI2 of between 0.1 and 1 g/10 min, wherein the density of copolymer (B) is between 929 and 947 kg/m3 the HLMI of the copolymer (B) is from 0.2 to 2 g/10 min.

23. Composition according to claim 2, wherein the relationship between spiral flow 'SF' (measured in mm at 250° C./1000 bar/100 mm/s) and ESCR 'E' (measured in hours) is E>540−3SF.

24. Composition according to claim 4, wherein the relationship between spiral flow 'SF', ESCR 'E' and melt index 'MI2' is E>(12000−36SF−1000MI2)/60.

25. Composition according to claim 5, which has a $SHI_{(1,100)}$ between 4 and 8.

26. Composition according to claim 7, which has a relationship between spiral flow 'SF' (measured in mm at 250° C./1000 bars/100 mm/s) and solubles 'S' (measured in g/kg) of S<0.1SF−2.5.

27. Composition according to claim 26, which has a relationship between spiral flow 'SF' (measured in mm at 250° C./1000 bars/100 mm/s) and solubles 'S' (measured in g/kg) of S<0.1SF−5.

\* \* \* \* \*